(12) United States Patent
Orteu

(10) Patent No.: US 10,464,686 B2
(45) Date of Patent: Nov. 5, 2019

(54) REAR MOUNT FOR AN AIRCRAFT ENGINE

(71) Applicant: Airbus Operations SAS, Toulouse (FR)

(72) Inventor: Benoit Orteu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 337 days.

(21) Appl. No.: 15/683,976

(22) Filed: Aug. 23, 2017

(65) Prior Publication Data

US 2018/0127105 A1 May 10, 2018

(30) Foreign Application Priority Data

Nov. 4, 2016 (FR) ...................................... 16 60687

(51) Int. Cl.
*B64D 27/26* (2006.01)
*F02C 7/20* (2006.01)

(52) U.S. Cl.
CPC ................. *B64D 27/26* (2013.01); *F02C 7/20* (2013.01); *B64D 2027/268* (2013.01)

(58) Field of Classification Search
CPC .............. B64D 27/24; B64D 2027/266; B64D 2027/268; F02C 7/20
See application file for complete search history.

(56) References Cited

U.S. PATENT DOCUMENTS

| 5,078,342 A | 1/1992 | Langley et al. |
| 7,566,029 B2 * | 7/2009 | Dron ...................... B64D 27/26 244/54 |
| 2006/0219841 A1 | 10/2006 | Dron et al. |
| 2008/0073460 A1 | 3/2008 | Beardsley et al. |

FOREIGN PATENT DOCUMENTS

| EP | 0431800 | 6/1991 |
| EP | 1852346 | 11/2007 |

OTHER PUBLICATIONS

French Search Report, dated Jun. 14, 2017, priority document.

* cited by examiner

*Primary Examiner* — Nicholas McFall
(74) *Attorney, Agent, or Firm* — Greer, Burns & Crain, Ltd.

(57) ABSTRACT

A rear engine mount for a turbomachine of an aircraft comprising a pylon. The rear engine mount comprises a beam attached to the pylon, a first and a second lateral connecting rod having an abutment and attached between the beam and the turbomachine, a three-point, V-shaped central connecting rod, of which the vertex is attached to the turbomachine, and of which the ends of the arms are attached to the beam. The rear engine mount has a plane of symmetry passing through the center of the ball joint of the vertex. The beam has, for each abutment, a buffer, wherein each abutment comes to bear against the buffer in the event of failure of the central connecting rod.

5 Claims, 2 Drawing Sheets

REAR MOUNT FOR AN AIRCRAFT ENGINE

CROSS-REFERENCES TO RELATED APPLICATIONS

This application claims the benefit of the French patent application No. 1660687 filed on Nov. 4, 2016, the entire disclosures of which are incorporated herein by way of reference.

TECHNICAL FIELD

The present invention relates to a rear mount for an aircraft engine, and to an aircraft comprising at least one such rear mount.

BACKGROUND OF THE INVENTION

An aircraft conventionally comprises at least one engine, in particular a turbomachine. Beneath each wing and for each turbomachine, the aircraft comprises a pylon which is attached to the structure of the wing and which extends beneath the wing and the turbomachine is suspended from the pylon.

The turbomachine is attached to the pylon via the intermediary of engine mounts, in particular, at the front by means of a front engine mount and at the rear by means of a rear engine mount that is secured to a rear portion of the turbomachine.

The rear engine mount conventionally comprises a beam that is attached to the pylon, a central connecting rod and two lateral connecting rods which attach the turbomachine to the beam.

The central connecting rod is in the overall shape of an L of which the corner is attached to the turbomachine so as to be able to rotate, and of which the end of the horizontal arm is attached to the beam so as to be able to rotate. The end of the vertical arm is attached to the beam so as to be able to rotate via the intermediary of a waiting fail-safe system which becomes active in the event of failure of one or more connecting rods.

Equally, one of the lateral connecting rods is in the shape of a F of which the corner is attached to the beam so as to be able to rotate, and of which the vertical arm is attached to the turbomachine so as to be able to rotate. The end of the horizontal arm is attached to the beam so as to be able to rotate via the intermediary of a waiting fail-safe system which becomes active in the event of failure of one or more connecting rods.

The other lateral connecting rod has one end attached to the beam so as to be able to rotate, and one end attached to the turbomachine so as to be able to rotate.

The connecting rods are conventional 2-point link rods.

Thus, the turbomachine is attached isostatically to the pylon and the rear engine mount has three degrees of freedom. In normal flight conditions, that is to say, when no elements have failed, each connecting rod has one degree of freedom in 2 points. However, in the fail-safe condition, when an element has failed, a blocked degree of freedom is lost and is taken on by the waiting fail-safe systems.

Although current rear engine mounts are entirely satisfactory, it is desirable to find different architectures that, in particular, have a symmetric distribution of the constituent parts.

SUMMARY OF THE INVENTION

The present invention has an object of proposing a rear engine mount that has a different, in particular symmetric, architecture.

To that end the invention proposes a rear engine mount for a turbomachine of an aircraft comprising a pylon, the rear engine mount comprising:

a beam designed to be attached to the pylon,
a first lateral connecting rod having an abutment,
a second lateral connecting rod having an abutment,
a three-point, V-shaped central connecting rod of which the vertex is designed to be attached via the intermediary of a ball joint to the turbomachine, and of which the ends of the two arms are attached via the intermediary of a ball joint to the beam, each lateral connecting rod having a first end attached via the intermediary of a ball joint to the beam and a second end designed to be attached via the intermediary of a ball joint to the turbomachine, the rear engine mount having a plane of symmetry passing through the center of the ball joint of the vertex, the beam having, for each abutment, a buffer, wherein each abutment is designed to bear against the buffer in the event of failure of the central connecting rod.

Thus, a rear engine mount of this type has symmetric qualities.

Advantageously, each lateral connecting rod is positioned so as to approach the other in the direction of the beam, and to move away from the other in the direction of the turbomachine.

Advantageously, one of the ball joints between the beam and the central connecting rod is of the waiting fail-safe system type.

Advantageously, each buffer is a separate part attached to the beam.

The invention also proposes an aircraft comprising at least one wing, at least one turbomachine per wing, and for each turbomachine a pylon attached to the structure of the wing, where each turbomachine is attached to the pylon via the intermediary of a rear engine mount according to one of the preceding variants.

BRIEF DESCRIPTION OF THE DRAWINGS

The above-mentioned features of the invention, and others, will appear more clearly upon reading the following description of an exemplary embodiment, the description being provided with reference to the appended drawings, in which.

DETAILED DESCRIPTION OF THE PREFERRED EMBODIMENTS

Figure 1:
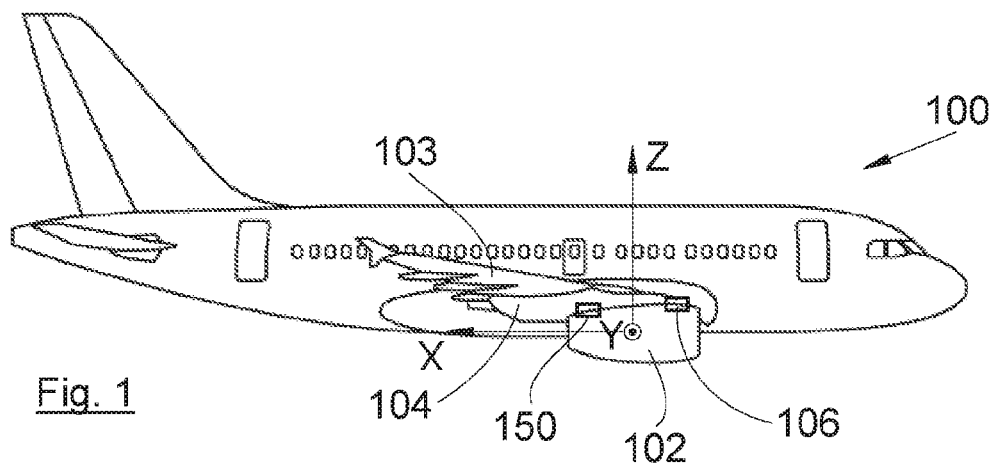
FIG. 1 is a side view of an aircraft according to the invention.

In the following description, terms relating to a position are considered with reference to an aircraft in forward motion, that is to say, as shown in FIG. 1.

FIG. 1 shows an aircraft 100 having a turbomachine 102.

In the following description, and by convention, the X-axis is the longitudinal axis of the turbomachine 102, with the positive direction oriented counter to the direction of forward motion of the aircraft 100; the Y-axis is the transverse direction of the turbomachine 102 and is horizontal when the aircraft is on the ground; and the Z-axis is the vertical direction or the vertical height when the aircraft is on the ground, these three directions X, Y and Z being mutually orthogonal.

In the embodiment of the invention shown in FIG. 1, the aircraft 100 comprises one turbomachine 102 beneath each wing 103, but it is possible to provide multiple turbomachines beneath each wing.

Beneath each wing 103, and for each turbomachine 102, the aircraft 100 has a pylon 104 which is attached to the structure of the wing 103 and extends beneath the wing 103. Each pylon 104 supports a turbomachine 102 that is attached to the pylon 104 via the intermediary of a front engine mount 106 and a rear engine mount 150 according to the invention.

Figure 2:
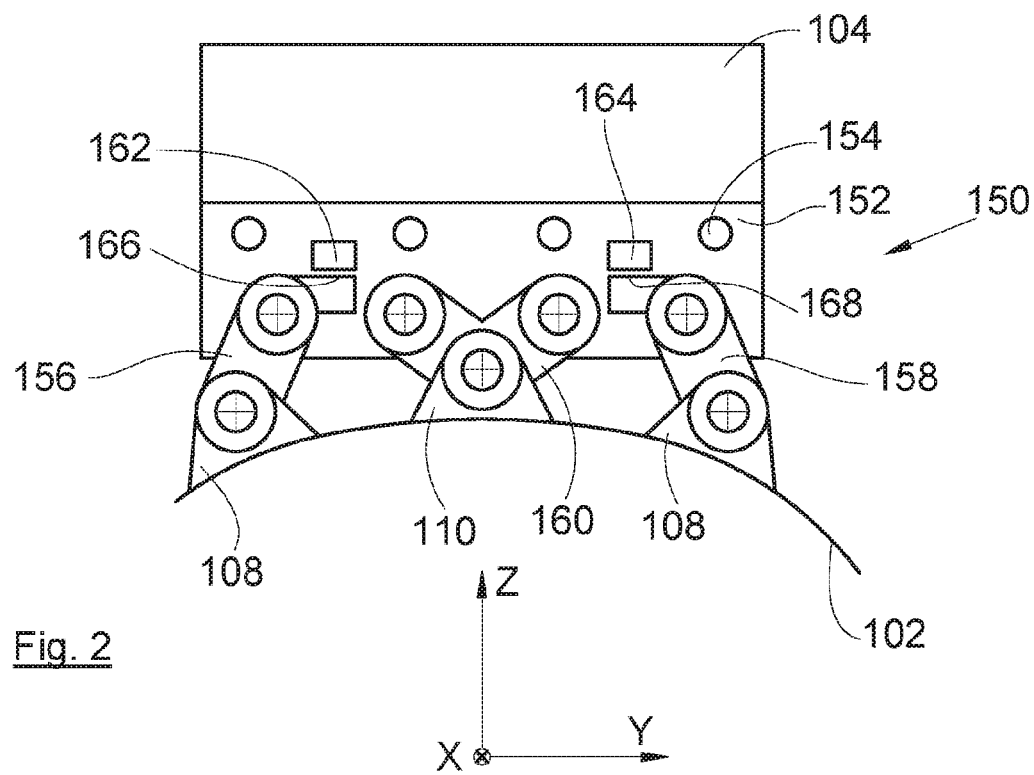
FIG. 2 is a schematic representation, seen from the front, of a rear engine mount according to the invention.

FIG. 2 is a schematic representation of a rear engine mount 150 that is attached between the pylon 104 and a structural element of the turbomachine 102, in particular the rear portion of the turbomachine 102, such as the tail bearing housing.

The rear engine mount 150 comprises a beam 152 that is attached to the pylon 104. The beam 152 is attached to the pylon 104 by any appropriate means, for example by means of bolts 154.

The rear engine mount 150 also has:
a first lateral connecting rod 156,
a second lateral connecting rod 158, and
a central connecting rod 160.

Each lateral connecting rod 156, 158 has a first end attached via the intermediary of a ball joint to the beam 152 and a second end attached via the intermediary of a ball joint to the turbomachine 102, which has engine devises 108 for that purpose.

The central connecting rod 160 is in the form of a three-point, V-shaped connecting rod of which the vertex is attached via the intermediary of a ball joint to the turbomachine 102, which has an engine clevis 110 for that purpose, and of which the ends of the two arms are attached via the intermediary of a ball joint to the beam 152.

The rear engine mount 150 has a plane of symmetry passing through the center of the ball joint of the vertex of the central connecting rod 160.

Figure 3:
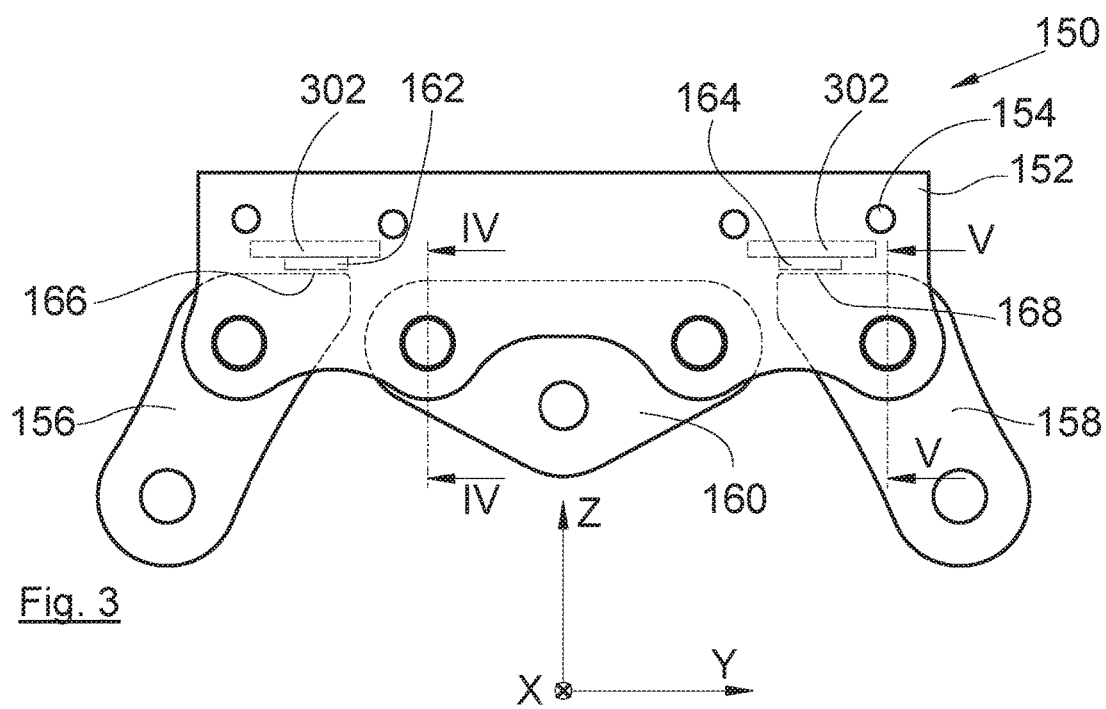
FIG. 3 is a front view of a rear engine mount according to the invention.

Preferably, and as shown in FIGS. 2 and 3, the plane of symmetry coincides with the XZ plane of the turbomachine 102.

Each lateral connecting rod 156, 158 is positioned so as to approach the other in the direction of the beam 152, and to move away from the other in the direction of the turbomachine 102. In other words, as seen in the direction of the Y-axis, the ball spindles of the lateral connecting rods 156 and 158 on the beam 152 are closer together than are the ball spindles of the lateral connecting rods 156 and 158 on the turbomachine 102.

Equally, the central connecting rod 160 is symmetric with respect to the plane of symmetry, that is to say, that the positions of the balls between the central connecting rod 160 and the beam 152 are symmetric with respect to the plane of symmetry.

Each connecting rod 156, 158, 160 is attached to the turbomachine 102 by means of any attachment system of the ball joint type.

In the event of failure of the central connecting rod 160, the rear engine mount 150 has, for each lateral connecting rod 156, 158, a buffer 162, 164. Each buffer 162, 164 is secured to the beam 152 and limits the angular deflection of the associated lateral connecting rod 156, 158 in a direction that tends to straighten the lateral connecting rod 156, 158. That is to say, that, when seen from the front, for the left-hand lateral connecting rod, (in this case the first lateral connecting rod 156), the buffer 162 limits the rotation of the lateral connecting rod 156 in the anti-clockwise direction, and, for the right-hand lateral connecting rod, (in this case the second lateral connecting rod 158), the buffer 164 limits the rotation of the lateral connecting rod 158 in the clockwise direction.

In order to engage with the buffer 162, 164 in question, each lateral connecting rod 156, 158 has an abutment 166, 168 which comes to bear against the buffer 162, 164.

Operation is then as follows: in normal operation, each buffer 162, 164 and the associated abutment 166, 168 remain apart from one another, and in the event of failure of the central connecting rod 160, and depending on the direction of the forces that act, one or other of the abutments 166, 168 will come to bear against the associated buffer 162, 164.

Therefore, the rear engine mount 150 is, overall, symmetric with respect to the plane of symmetry, in this case XZ, and has waiting fail-safe systems comprising the buffers 162, 164 and the abutments 166, 168 which become active if required. The symmetry of the rear engine mount 150 makes it possible to obtain balanced loading on the turbomachine 102.

One of the ball joints between the beam 152 and the central connecting rod 160 is of the waiting fail-safe type, that is to say, that it becomes active only in the event of failure of one of the lateral connecting rods 156, 158. In the embodiment of the invention shown in FIG. 2, the left-hand connection is a waiting fail-safe system. Under normal conditions, the left-hand connection transmits no forces, and the three connecting rods 156, 158, 160 then function as two-point connecting rods; in the event of failure, the left-hand connection becomes active and the central connecting rod 160 then functions as a three-point connecting rod.

Thus, in the event of failure of a lateral connecting rod 156, 158, the waiting fail-safe connection of the central connecting rod 160 becomes active while the buffers 162, 164 and abutments 166, 168 remain apart from one another.

FIG. 3 shows the rear engine mount 150.

Each buffer 162, 164 is a separate part which can therefore be sacrificed and replaced in the event of fail-safe operation, and the installation of such a part avoids any crack propagation in the beam 152 at the point of contact with the abutment 166, 168.

Thus, each buffer 162, 164 is attached to a support portion 302 of the beam 152.

Figure 4:
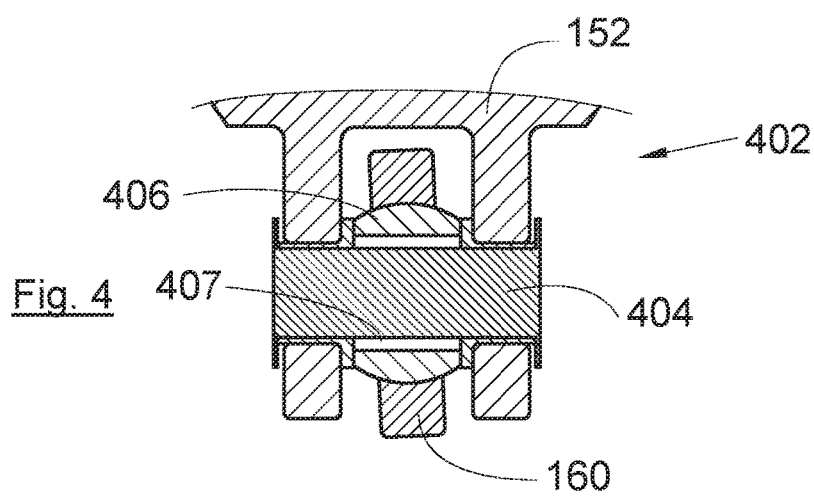
FIG. 4 is a view in section along the line IV-IV of FIG. 3.

FIG. 4 shows an embodiment of the waiting fail-safe system at the connection between the central connecting rod 160 and the beam 152.

The beam 152 has a clevis 402 that has a spindle 404.

The waiting fail-safe system also comprises a ball 406 around which the central connecting rod 160 is fitted, and which is mounted coaxially on the spindle 404 with a radial clearance 407 between the spindle 404 and the ball 406. In normal operation, the clearance 407 avoids the transmission of forces between the central connecting rod 160 and the beam 152, and in the event of failure, the ball 406 moves off-axis to come to bear against the spindle 404 and thus transmit forces.

Figure 5:
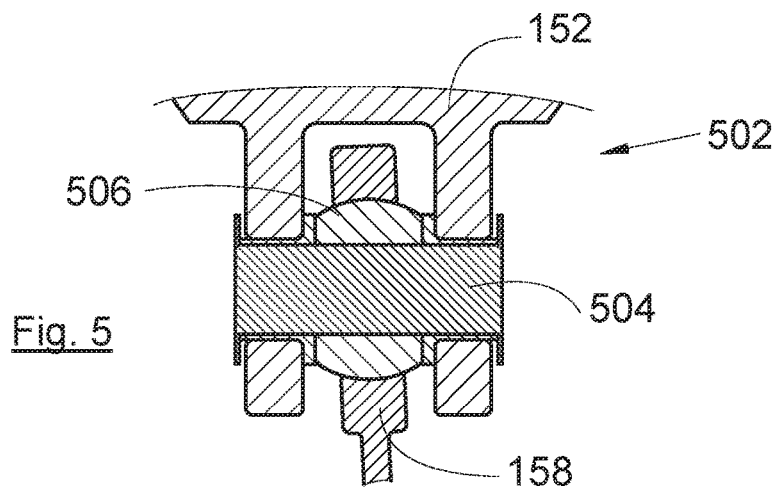
FIG. 5 is a view in section along the line V-V of FIG. 3.

FIG. 5 shows an embodiment of the connection between the second lateral connecting rod 158 and the beam 152, which has a clevis 502 that bears a spindle 504.

The connection system also comprises a ball 506 around which the second lateral connecting rod 158 is fitted, and which is mounted coaxially and tightly on the spindle 504.

In normal operation, the ball 506 transmits forces between the second lateral connecting rod 158 and the beam 152.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine mount for a turbomachine of an aircraft comprising a pylon, said rear engine mount comprising:
   a beam designed to be attached to the pylon,
   a first lateral connecting rod having an abutment,
   a second lateral connecting rod having an abutment,
   a three-point, V-shaped central connecting rod having two arms joined by a vertex, of which the vertex is configured to be attached via an intermediary of a ball joint to the turbomachine, and free ends of the two arms are attached via an intermediary of a ball joint to the beam,
   each lateral connecting rod having a first end attached via an intermediary of a ball joint to the beam and a second end configured to be attached via an intermediary of a ball joint to the turbomachine,
   a plane of symmetry passing through a center of the ball joint of the vertex,
      the beam having, for each abutment, a buffer, wherein each abutment is configured to bear against said buffer in an event of failure of the central connecting rod.

2. The rear engine mount according to claim 1, wherein each lateral connecting rod is positioned to approach the other in a direction of the beam, and to move away from the other in a direction of the turbomachine.

3. The rear engine mount according to claim 1, wherein one of the ball joints between the beam and the central connecting rod is of the waiting fail-safe system type.

4. The rear engine mount according to claim 1, wherein each buffer is a separate part attached to the beam.

5. An aircraft comprising:
   at least one wing,
   at least one turbomachine per wing, and
   for each turbomachine, a pylon attached to the structure of the wing,
      each turbomachine being attached to said pylon via an intermediary of a rear engine mount, comprising:
         a beam designed to be attached to the pylon,
         a first lateral connecting rod having an abutment,
         a second lateral connecting rod having an abutment,
         a three-point, V-shaped central connecting rod having two arms joined by a vertex, of which the vertex is configured to be attached via an intermediary of a ball joint to the turbomachine, and free ends of the two arms are attached via an intermediary of a ball joint to the beam,
         each lateral connecting rod having a first end attached via an intermediary of a ball joint to the beam and a second end configured to be attached via an intermediary of a ball joint to the turbomachine,
         a plane of symmetry passing through a center of the ball joint of the vertex,
            the beam having, for each abutment, a buffer, wherein each abutment is configured to bear against said buffer in an event of failure of the central connecting rod.

* * * * *